United States Patent
Tani et al.

(10) Patent No.: US 10,322,641 B2
(45) Date of Patent: Jun. 18, 2019

(54) VEHICLE POWER SUPPLY DEVICE

(71) Applicant: Mitsubishi Electric Corporation, Tokyo (JP)

(72) Inventors: Hideaki Tani, Tokyo (JP); Satoshi Wachi, Tokyo (JP); Hiroyuki Saito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 114 days.

(21) Appl. No.: 15/526,773

(22) PCT Filed: Apr. 15, 2015

(86) PCT No.: PCT/JP2015/061572
§ 371 (c)(1),
(2) Date: May 15, 2017

(87) PCT Pub. No.: WO2016/166833
PCT Pub. Date: Oct. 20, 2016

(65) Prior Publication Data
US 2017/0326999 A1    Nov. 16, 2017

(51) Int. Cl.
*B60L 11/18*    (2006.01)
*H02J 7/00*    (2006.01)
(Continued)

(52) U.S. Cl.
CPC ......... *B60L 11/1861* (2013.01); *B60L 3/0038* (2013.01); *B60L 3/0046* (2013.01);
(Continued)

(58) Field of Classification Search
USPC ....................................................... 320/134
See application file for complete search history.

(56) References Cited

U.S. PATENT DOCUMENTS

| 6,225,788 B1 | 5/2001 | Kouzu et al. |
| 6,344,728 B1 | 2/2002 | Kouzu et al. |

(Continued)

FOREIGN PATENT DOCUMENTS

| JP | 2002223507 A | 8/2002 |
| JP | 2004-006415 A | 1/2004 |

(Continued)

OTHER PUBLICATIONS

Communication dated Dec. 12, 2017 from the Japanese Patent Office in counterpart Application No. 2017-512117.

(Continued)

*Primary Examiner* — Bryce M Aisaka
(74) *Attorney, Agent, or Firm* — Sughrue Mion, PLLC; Richard C. Turner (57) ABSTRACT

In order to detect failure of a charge/discharge current sensor for a battery and estimate and manage the state of charge of the battery when the charge/discharge current sensor has failed, provided are: a state-of-charge estimation unit for estimating the state of charge of the battery; an operation current estimation unit for estimating operation current of an electric load connected to the battery; and a charge/discharge current sensor failure detection unit for determining that failure occurs on the charge/discharge current sensor for detecting charge/discharge current of the battery, when a difference between the charge/discharge current and the operation current estimation value is equal to or greater than a predetermined value, wherein, when failure of the charge/discharge current sensor is detected, the electric load is operated at low output, and the state of charge of the battery is estimated using the operation current estimation value.

6 Claims, 4 Drawing Sheets

(51) Int. Cl.
  B60R 16/033   (2006.01)
  H01M 10/44   (2006.01)
  H01M 10/48   (2006.01)
  H01M 10/42   (2006.01)
  B60L 3/00    (2019.01)
  H01M 2/34    (2006.01)
(52) U.S. Cl.
  CPC ........ *B60L 11/1877* (2013.01); *B60R 16/033* (2013.01); *H01M 10/425* (2013.01); *H01M 10/443* (2013.01); *H01M 10/486* (2013.01); *H02J 7/00* (2013.01); *H02J 7/0021* (2013.01); *H02J 7/0026* (2013.01); *H02J 7/0029* (2013.01); *H02J 7/0091* (2013.01); *B60L 2240/545* (2013.01); *B60L 2240/547* (2013.01); *B60L 2240/549* (2013.01); *H01M 2/34* (2013.01); *H01M 2200/00* (2013.01); *H01M 2220/20* (2013.01); *H02J 2007/0039* (2013.01); *Y02T 10/705* (2013.01); *Y02T 10/7016* (2013.01); *Y02T 10/7044* (2013.01); *Y02T 10/7055* (2013.01)

(56) References Cited

U.S. PATENT DOCUMENTS 6,411,063 B1   6/2002   Kouzu et al.
2008/0048619 A1   2/2008   Yoshida et al.
2010/0070133 A1   3/2010   Ishishita
2013/0297243 A1*   11/2013   Baba .................. B60L 11/1861
                                                                    702/63
2014/0177145 A1*   6/2014   Kawahara ........... H01M 10/441
                                                                    361/679.01

FOREIGN PATENT DOCUMENTS

JP      200620401 A    1/2006
JP      2008-043188 A  2/2008
JP      2008-220088 A  9/2008
JP      2011-041422 A  2/2011
JP      201390474 A    5/2013
JP      5372872 B2     12/2013
JP      2014241662 A   12/2014

OTHER PUBLICATIONS

International Search Report for PCT/JP2015/061572, dated Jul. 21, 2015.
Communication dated May 8, 2018, from the Japanese Patent Office in counterpart application No. 2017-512117.

* cited by examiner

VEHICLE POWER SUPPLY DEVICE

CROSS REFERENCE TO RELATED APPLICATIONS

This Application is a National Stage of Intentional Application No. PCT/JP2015/061572 filed Apr. 15, 2015, the contents of all of which are incorporated herein by reference in their entirety.

TECHNICAL FIELD

The present invention relates to a vehicle power supply device, and in particular, relates to a vehicle power supply device that detects failure of a current sensor for detecting charge/discharge current of a battery and estimates the state of charge of the battery upon failure.

BACKGROUND ART

In vehicles, an electric generator and a secondary battery are provided for supplying power to various electric loads. In response to great demand for improvement in fuel consumption in recent years, a lithium ion battery and the like having a high energy density are being employed for second batteries, as power extension measures for conventional lead batteries. In order to safely use such a battery, it is necessary to detect charge/discharge current, battery voltage, and the battery temperature of the battery, and in addition, the state of charge (hereinafter, referred to as SOC) of the battery. In calculation of the SOC, a current sensor (hereinafter, referred to as a charge/discharge current sensor) for detecting charge/discharge current of the battery serves an important role.

Therefore, if the charge/discharge current sensor is abnormal, it is necessary to immediately detect failure and take a fail-safe measure which enables evacuation travelling while protecting the battery. Accordingly, the following method has been proposed: when failure of the charge/discharge current sensor is detected, SOC estimation for the battery is continued using total current outputted from current sensors (hereinafter, referred to as electric load current sensors) provided for respective electric loads of the battery (see Patent Literature 1).

CITATION LIST

Patent Literature

Patent Literature 1: Japanese Patent No. 5372872

SUMMARY OF THE INVENTION

Problems to be Solved by the Invention

However, in the conventional technique shown in Patent Literature 1, failure of the charge/discharge current sensor is detected only when the output value is out of a normal range, and performance abnormality of the charge/discharge current sensor based on comparison with the total current of the electric load current sensors cannot be detected. This is because, if there is abnormality on the electric load current sensor side, it is impossible to determine which of the charge/discharge current sensor and the electric load current sensor has failed. In addition, providing the electric load current sensors for respective electric loads can cause complication in the system, leading to increase in the cost for the sensors, electric wirings, a receiver-side interface, and the like.

The present invention has been made to solve the above problem, and an object of the present invention is to provide a vehicle power supply device that enables removal of a current sensor for each electric load by estimating operation current of the electric load and that is capable of detecting performance abnormality of a charge/discharge current sensor on the basis of comparison with an electric load operation current estimation value, and when the charge/discharge current sensor has failed, immediately causing the electric load to operate at low output, and continuing SOC estimation for the battery at a desired accuracy by using the electric load operation current estimation value.

Solution to the Problems

A vehicle power supply device according to the present invention includes: a charge/discharge current sensor for detecting charge/discharge current of a battery; and a power supply management device for vehicle for managing a state of the battery. The power supply management device includes: a state-of-charge estimation unit for estimating a state of charge of the battery on the basis of charge/discharge current, voltage, and temperature of the battery; an operation current estimation unit for estimating operation current flowing through an electric load connected to the battery; and a charge/discharge current sensor failure detection unit for determining that failure occurs on the charge/discharge current sensor when a difference between the charge/discharge current detected by the charge/discharge current sensor and a value estimated by the operation current estimation unit is equal to or greater than a predetermined value. The power supply management device is configured to, when failure of the charge/discharge current sensor is detected, cause the electric load to operate at low output and estimate the state of charge of the battery using the operation current estimation value.

Effect of the Invention

The vehicle power supply device according to the present invention makes it possible to remove a current sensor for each electric load, thereby achieving system simplification and cost reduction. In addition, since performance abnormality of the charge/discharge current sensor is detected on the basis of comparison with the electric load operation current estimation value, it is possible to improve reliability of the charge/discharge current sensor, as compared to the case of detecting only abnormality that the output value is out of a normal range.

Further, when the charge/discharge current sensor has failed, the electric load is immediately operated at low output, and estimation of the state of charge of the battery is continued at a desired accuracy, using the electric load operation current estimation value. Therefore, it is possible to take a fail-safe measure which enables evacuation travelling while protecting the battery.

Objects, features, and effects of the present invention will be clearly understood from the detailed description of the embodiments below and the accompanying drawings.

DESCRIPTION OF EMBODIMENTS

Embodiment 1

Hereinafter, embodiment 1 of the present invention will be described with reference to the drawings.

Figure 1:
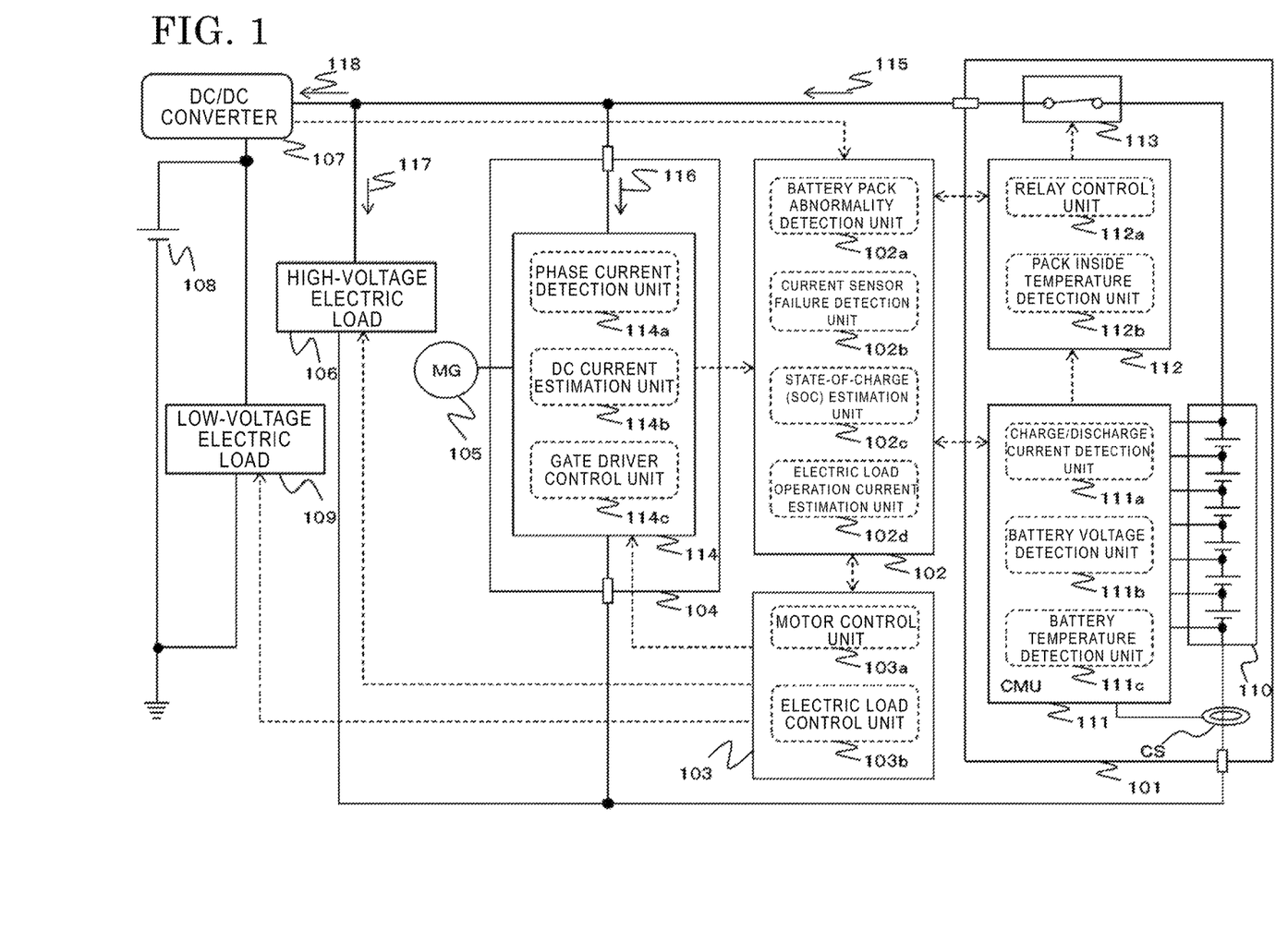
FIG. 1 is a schematic configuration diagram of an entire vehicle power supply system including a power supply management device for vehicle according to embodiment 1 of the present invention.

FIG. 1 shows a schematic configuration of an entire vehicle power supply device according to embodiment 1 of the present invention. In FIG. 1, the vehicle power supply device includes a battery pack 101, a power supply management device 102, a vehicle control device 103, a motor generator (hereinafter, referred to as MG) 105, an inverter 104 for MG, a high-voltage electric load 106, a DC/DC converter 107, a lead battery 108 serving as a low-voltage battery, and a low-voltage electric load 109.

Here, a high-voltage power supply system is composed of: the battery pack 101; the MG 105 mechanically connected to an internal combustion engine (not shown) and serving to generate power for the vehicle or drive the vehicle; the inverter 104 for controlling operation of the MG 105; and the high-voltage electric load 106 of the vehicle. On the other hand, a low-voltage power supply system is composed of: the power supply management device 102; the vehicle control device 103; the DC/DC converter 107 for performing reception and feeding of power between the high-voltage power supply system and the low-voltage power supply system; the lead battery 108; and the low-voltage electric load 109 of the vehicle. The power supply management device 102 is configured from a microcomputer, and when abnormality of the battery pack 101 is detected, the power supply management device 102 opens the contact of a fail-safe relay 113 inside the battery pack 101, commands the vehicle control device 103 to perform emergency power feeding and evacuation travelling of the vehicle, and commands the DC/DC converter 107 to generate low output. The vehicle control device 103 controls the internal combustion engine (not shown), and in response to the command from the power supply management device 102, controls the MG 105 via the inverter 104 and controls the high-voltage electric load 106 and the low-voltage electric load 109. The vehicle control device 103 includes a motor control unit 103a and an electric load control unit 103b.

The battery pack 101 is composed of: an assembled battery 110 which is formed of a plurality of cells connected in series and generates high-voltage output; a cell monitoring unit (hereinafter, referred to as CMU) 111 which is connected to the assembled battery 110 and detects the state of each unit cell; the fail-safe relay 113 for disconnecting electric connection between the battery pack 101 and the other circuit when the battery pack 101 is abnormal; and a control board 112 for controlling driving of the fail-safe relay 113 on the basis of output from the CMU 111. Here, the CMU 111 includes: a charge/discharge current detection unit 111a for detecting charge/discharge current of each unit cell; a cell voltage detection unit 111b for detecting voltage of each unit cell; and a cell temperature detection unit 111c for detecting the temperature of each unit cell, and the CMU 111 calculates the SOC of the entire assembled battery 110 via the power supply management device 102 on the basis of the above detection values. The SOC calculation method will be described later with reference to FIG. 2. The control board 112 includes a relay control unit 112a for controlling the fail-safe relay 113, and in addition, includes a pack inside temperature detection unit 112b for detecting the temperature of a circuit part inside the battery pack 101. The CMU 111 and the control board 112 transmit their respective signals indicating the detected states of the battery pack 101, to the power supply management device 102. The motor control board 114 includes a phase current detection unit 114a, a DC current estimation unit 114b, and a gate driver control unit 114c.

The power supply management device 102 detects abnormality inside the battery pack 101 and also detects whether there is abnormality on the detected value of each state, and issues a command to take a fail-safe measure according to the failure state. For example, in the case where a charge/discharge current sensor CS for detecting charge/discharge current of the assembled battery 110 has failed, the power supply management device 102 loses an overcurrent detection function and an SOC estimation function based on the charge/discharge current. However, since the contact of the fail-safe relay 113 is not opened unless there is abnormality on the assembled battery 110, the power supply management device 102 estimates electric load operation current 115 in place of the detection function based on the charge/discharge current, thereby taking a fail-safe measure which enables evacuation travelling while protecting the assembled battery 110. The failure detection and the fail-safe measure will be described later with reference to FIG. 2.

In the present embodiment, the battery pack 101, the power supply management device 102, the vehicle control device 103, the inverter 104, the MG 105, and the DC/DC converter 107 are provided separately from each other, but they may be integrated. For example, the function of the power supply management device 102 may be incorporated in the vehicle control device 103 configured from a microcomputer, whereby the devices can be integrated. In this case, effects of cost reduction and weight reduction by the integration can be obtained. On the other hand, in the case where the power supply management device 102 and the vehicle control device 103 are provided separately from each other, there are advantages that it is possible to add the function without modifying the original vehicle control device 103, and it is possible to drive the vehicle by only the vehicle control device 103 when abnormality occurs on the power supply management device 102.

The power supply management device 102 may control electric generation and power consumption in the vehicle via the vehicle control device 103 by transmitting, to the vehicle control device 103, any of charge/discharge permissible power and output terminal target voltage of the battery pack 101, operation power and operation torque of the MG 105, and discharge power of the electric load. The MG 105 may be an alternator having only an electric generation function. As the internal configuration of the battery pack 101, the case where the CMU 111, the control board 112, and the fail-safe relay 113 are provided separately from each other is shown, but they may be integrated. As for the assembled battery 110 and the CMU 111, the case where one pair of them is provided is shown, but a plurality of the CMUs 111 may be provided in accordance with the number of rows of the unit cells. The CMU 111 and the control board 112 may be configured to perform abnormality determination on the basis of the internal states of the battery pack 101 detected by themselves, and upon abnormality, open the contact of the fail-safe relay 113 without depending on a command from the power supply management device 102.

Figure 2:
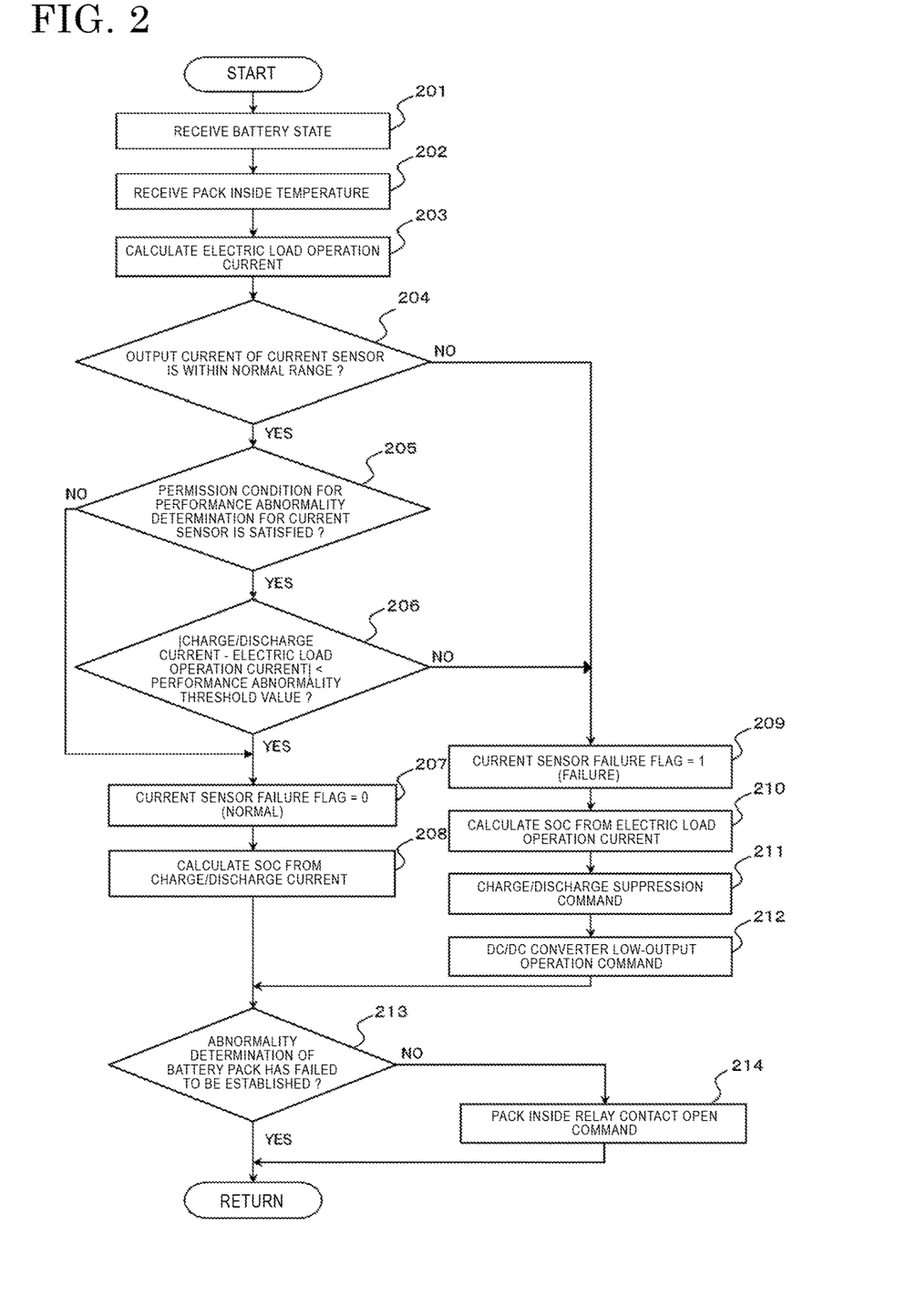
FIG. 2 is a flowchart showing a control process of the power supply management device according to embodiment 1 of the present invention.

FIG. 2 is a flowchart showing a control process of the power supply management device 102 in embodiment 1 of the present invention.

First, in step 201, the power supply management device 102 receives signals of the charge/discharge current, voltage, and temperature of each unit cell from the CMU 111, and in step 202, receives a signal of temperature of the circuit part of the battery pack 101 from the battery pack control board 112. Next, in step 203, operation current 115 of all the electric loads connected to the battery pack 101 is estimated. A method for estimating the operation current 115 of the electric loads will be described later with reference to FIG. 3.

Next, in step 204, whether output current of the charge/discharge current sensor CS is within a normal range is determined, and if the output current is within the normal range, the process proceeds to step 205. Here, determination that the output of the charge/discharge current sensor CS is abnormal, is made when a current value beyond an overcurrent region, which could not occur in normal use, is outputted due to electric failure of the circuit part. In step 205, whether a permission condition for performance abnormality determination for the charge/discharge current sensor CS is satisfied is determined, and if the permission condition is satisfied, the process proceeds to step 206. The permission condition is a condition taken into consideration so as not to cause erroneous determination in the subsequent performance abnormality determination for the charge/discharge current sensor CS. In the case where it is assumed that there is great transitional variation in charge/discharge current of the battery pack 101 at a timing such as immediately after mode change in electric generation or drive control of the MG 105 or at the start of operation of the high-voltage electric load 106, the permission condition is determined to be not satisfied during the period until the variation converges.

In step 206, performance abnormality determination for the charge/discharge current sensor CS is performed. That is, if a difference between the charge/discharge current and an estimation value of the electric load operation current 115 is equal to or smaller than a performance abnormality threshold value, abnormality is not detected, and the process proceeds to step 207 to set a charge/discharge current sensor failure flag at 0 (normal). Here, the performance abnormality threshold value is set in accordance with the operation state of the electric loads, and is a suited value set by considering a margin for variation in the difference obtained through travelling evaluation when the charge/discharge current sensor CS is in a normal state.

In step 205, if the permission condition for performance abnormality determination for the charge/discharge current sensor CS is not satisfied, performance abnormality determination for the charge/discharge current sensor CS is not performed, and the process proceeds to step 207 to set the failure flag for the charge/discharge current sensor CS at 0 (normal). Then, the process proceeds to step 208.

In step 208, the SOC is calculated from the charge/discharge current, and the process proceeds to step 209.

In step 204, if the output current of the charge/discharge current sensor CS is out of a normal range, and in step 206, if a difference between the charge/discharge current and the estimation value of the electric load operation current 115 is equal to or greater than the performance abnormality threshold value, performance abnormality of the charge/discharge current sensor CS is detected, and in step 209, the failure flag for the charge/discharge current sensor CS is set at 1 (failure), and the process proceeds to step 210.

In step 210, the SOC is calculated on the basis of the electric load operation current 115, and the process proceeds to step 211. It is noted that, also in step 208, the SOC is calculated on the basis of the charge/discharge current, and these operations are different only in their input currents but the same calculation process is performed in both operations. In this SOC calculation process, an SOC calculated from a map stored in advance on the basis of open-circuit voltage (hereinafter, referred to as OCV) and the battery temperature when the vehicle key is turned on is used as an initial value, and the SOC is updated through an integration process of input current or a sequential estimation process of circuit parameters by an equivalent circuit model method, thereby calculating the SOC at present.

Next, in step 211 and step 212, as a control process when the charge/discharge current sensor CS has failed, a charge/discharge suppression command is transmitted to the vehicle control device 103, and the DC/DC converter 107 is commanded to perform low-output operation.

Figure 4:
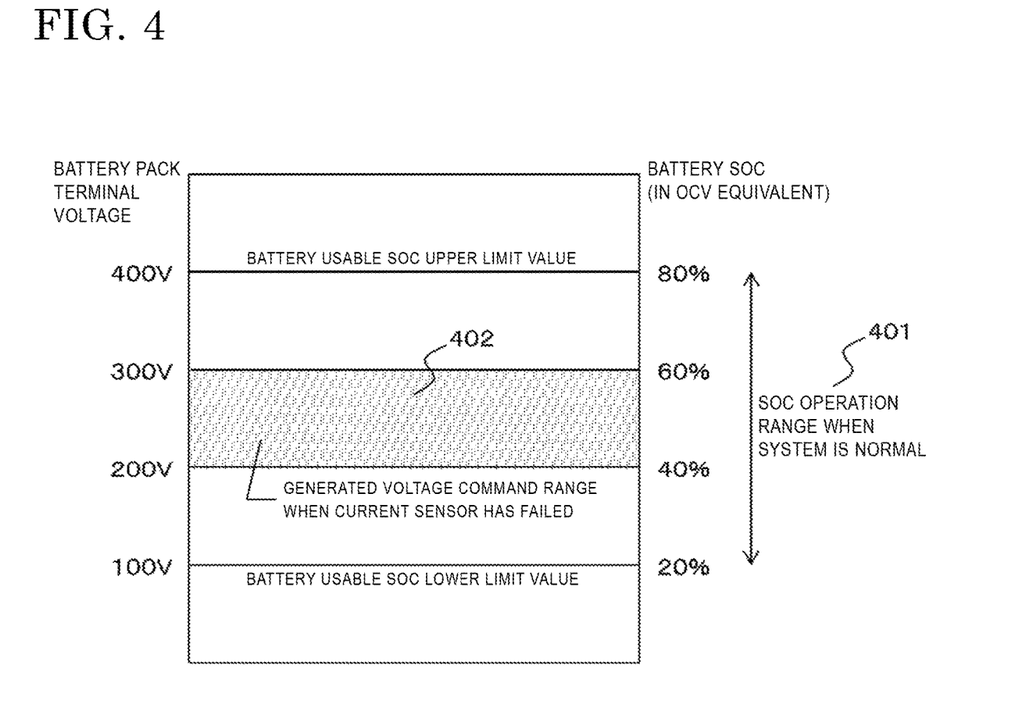
FIG. 4 is a characteristics diagram showing a generated voltage command range when a charge/discharge current sensor has failed, according to embodiment 1 of the present invention.

Here, the charge/discharge suppression command in step 211 will be described. As shown in FIG. 4, when the charge/discharge current sensor CS has failed, the power supply management device 102 reduces the operation range of SOC to be a generated voltage command range 402 so as to be narrower than a normal range 401. Thus, even if unexpected battery output occurs, the battery can be safely used without the SOC reaching the upper/lower limit value of the usable range. In other words, by issuing a command for electric generation at a predetermined voltage within the generated voltage command range 402, the operation range of OCV obtained by subtracting the internal resistance from the terminal voltage of the battery pack 101 is limited, whereby the operation range of SOC determined by the OCV and the battery temperature can be limited.

Returning to FIG. 2, in step 211 and step 212, the MG 105, the high-voltage electric load 106, and the DC/DC converter 107 are caused to perform low-output operation, the battery output is limited to power needed for evacuation travelling, and power feeding is limited to specified electric loads. As a result, estimation accuracy for the electric load operation current 115 can be managed to be a desired accuracy. It is noted that, as a result of the low-output operation of the DC/DC converter 107, if power consumed in the low-voltage electric load 109 exceeds the output limit of the DC/DC converter 107, the lead battery 108 feeds the shortfall power to the low-voltage electric load 109.

Next, in step 213, on the basis of the charge/discharge current, voltage, and temperature of each unit cell received in step 201, temperature of the circuit part of the battery pack 101 received in step 202, and the SOC calculated in step 208 or 210, the battery pack 101 is determined to be abnormal when one of these values reaches the corresponding upper/lower limit value, and the process proceeds to step 214. Here, as for the charge/discharge current, when the charge/discharge current sensor CS has failed, the estimation value of the operation current 115 of the electric load calculated in step 203 is used.

In step 214, a command for opening the contact of the fail-safe relay 113 is issued to open the contact of the fail-safe relay 113, thereby stopping input and output of the assembled battery 110.

Figure 3:
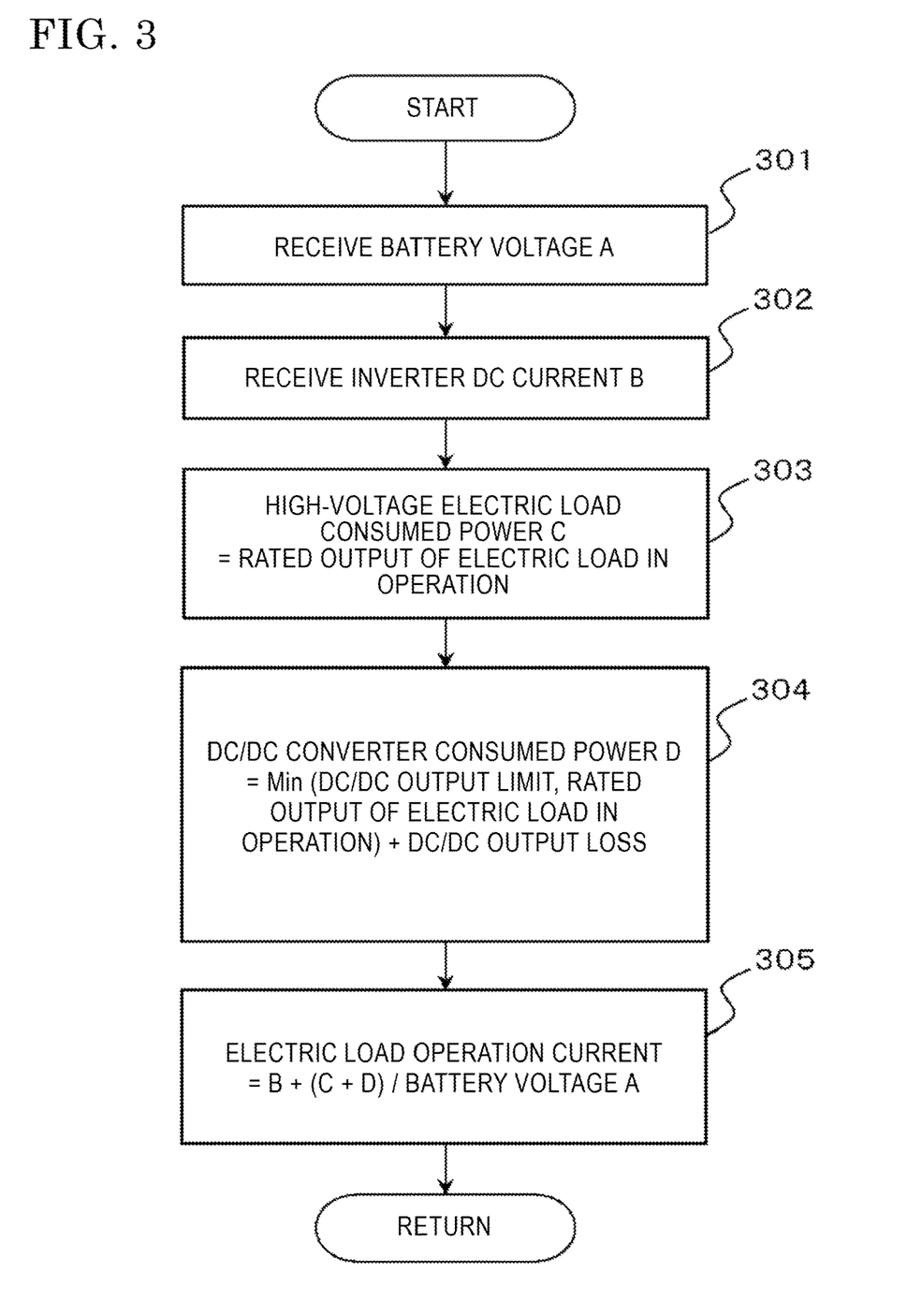
FIG. 3 is a flowchart showing a control process for estimating electric load operation current by the power supply management device according to embodiment 1 of the present invention.

FIG. 3 is a flowchart showing a control process for estimating the electric load operation current 115 by the power supply management device 102 according to embodiment 1 of the present invention.

First, in step 301, a signal of total voltage A of the assembled battery 110 is received from the CMU 111, and in step 302, a signal of DC current B which is input/output current is received from the inverter 104. Here, the DC current of the inverter 104 is estimated by an internal motor control board 114, and is a total current calculated by multiplying currents for respective phases for driving the MG 105 by a drive duty cycle. Next, in step 303, consumed power C of the high-voltage electric load 106 is calculated on the basis of total rated output of the electric loads that are in operation, and the process proceeds to step 304. It is noted that, regarding an electric load having a control device other than a simple ON/OFF load, without limitation to the above, the power supply management device 102 can similarly calculate the total output of the high-voltage electric load 106 on the basis of a parameter received through communication.

Next, in step 304, if the DC/DC converter 107 does not reach the output limit, output loss in the DC/DC converter 107 is added to the rated output of the low-voltage electric load 109 that is in operation, to calculate consumed power D of the DC/DC converter 107. It is noted that, in the case where a control board inside the DC/DC converter 107 can calculate the consumed power D or operation output, without limitation to the above, the power supply management device 102 can similarly receive information about the power through communication. It is noted that, if the DC/DC converter 107 reaches the output limit due to the low-output operation or the like, the consumed power D of the DC/DC converter 107 corresponds to this output limit value.

Finally, in step 305, the electric load operation current 115 is calculated by a formula "DC current B of inverter 104+(consumed power C of high-voltage electric load 106+consumed power D of DC/DC converter 107)/battery voltage A".

Here, the total current is calculated by dividing the total output of the consumed power C of the high-voltage electric load 106 and the consumed power D of the DC/DC converter 107 by the battery voltage A. However, if each consumption current can be estimated individually, in step 305, these currents may be added to the DC current B of the inverter 104. As for the DC current B of the inverter 104, if the total output of the inverter 104 can be calculated, the total current B may be calculated by dividing the total output by the battery voltage A.

Thus, the power supply management device for vehicle in the present invention provides the following features and effects.

Firstly, provided are: a charge/discharge current sensor for detecting charge/discharge current of a battery; and a power supply management device for vehicle for managing the state of the battery. The power supply management device includes: a state-of-charge estimation unit for estimating the state of charge of the battery on the basis of charge/discharge current, voltage, and temperature of the battery; an operation current estimation unit for estimating operation current flowing through an electric load connected to the battery; and a charge/discharge current sensor failure detection unit for determining that failure occurs on the charge/discharge current sensor, when a difference between the charge/discharge current detected by the charge/discharge current sensor and the value estimated by the operation current estimation unit is equal to or greater than a predetermined value, wherein, when failure of the charge/discharge current sensor is detected, the electric load is operated at low output and the state of charge of the battery is estimated using the operation current estimation value. Such a configuration makes it possible to remove a current sensor provided for each electric load, thereby achieving system simplification and cost reduction. In addition, since performance abnormality of the charge/discharge current sensor is detected on the basis of comparison with the electric load operation current estimation value, it is possible to improve reliability of the charge/discharge current sensor, as compared to the case of detecting only abnormality that the output value is out of a normal range. Further, when the charge/discharge current sensor has failed, the electric load is immediately operated at low output, and estimation of the state of charge of the battery is continued at a desired accuracy, using the electric load operation current estimation value. Therefore, it is possible to take a fail-safe measure which enables evacuation travelling while protecting the battery.

Secondly, in addition to the above first configuration, the power supply management device includes: a voltage sensor for detecting voltage of the battery; and an operation power estimation unit for estimating operation power of the electric load connected to the battery, wherein the operation current is estimated from the estimated operation power of the electric load and the voltage of the battery detected by the voltage sensor. Thus, the same effect as in the first configuration can be obtained.

Thirdly, the state-of-charge operation range of the battery is reduced when failure of the charge/discharge current sensor is detected. Thus, it is possible to safely use the battery even when unexpected battery output occurs.

Fourthly, when failure of the charge/discharge current sensor is detected, an electric generation control unit for controlling an on-vehicle electric generator in accordance with the travelling state of the vehicle is controlled and commanded to perform electric generation at predetermined voltage. Thus, it is possible to limit the operation range of the state of charge of the battery.

Fifthly, a battery abnormality detection unit is provided which detects that the battery is abnormal when the state of charge of the battery reaches an upper/lower limit value, whereby estimation of the state of charge of the battery can be continued. In addition, the electric generation control function can be integrated together with the power supply management function, whereby system simplification and cost reduction can be achieved.

Sixthly, a fail-safe relay is provided which interrupts output of the battery on the basis of a command from the battery abnormality detection unit, whereby output of the battery can be interrupted when the charge/discharge current sensor has failed.

It is noted that, within the scope of the present invention, the above embodiment may be modified or simplified as appropriate.

DESCRIPTION OF THE REFERENCE CHARACTERS 101 battery pack
102 power supply management device
102a battery pack abnormality detection unit
102b current sensor failure detection unit
102c state-of-charge estimation unit
102d electric load operation current estimation unit
103 vehicle control device 104 inverter
105 motor generator
106 high-voltage electric load
107 DC/DC converter
108 lead battery
109 low-voltage electric load
110 assembled battery
111 cell monitoring unit
112 battery pack control board
113 fail-safe relay
114 motor control board
115 electric load operation current
CS charge/discharge current sensor

The invention claimed is:

1. A vehicle power supply device comprising:
a battery;
a charge/discharge current sensor configured to detect a charge/discharge current of the battery; and
a power supply management device for vehicle, wherein the power supply management device is configured to manage an operation of the battery,
wherein the power supply management device includes:
   a state-of-charge estimation unit configured to estimate a state of charge of the battery based on the charge/discharge current, a voltage, and a temperature, of the battery;
   an operation current estimation unit configured to estimate an operation current value flowing through an electric load connected to the battery; and
   a charge/discharge current sensor failure detection unit configured to determine that a failure occurs on the charge/discharge current sensor when a difference between the charge/discharge current detected by the charge/discharge current sensor and the operation current value estimated by the operation current estimation unit is equal to or greater than a predetermined value,
wherein the power supply management device is further configured to, when the failure of the charge/discharge current sensor is detected, cause the electric load to perform a low-output operation and estimate the state of charge of the battery using the estimated operation current value.

2. The vehicle power supply device according to claim 1, wherein the power supply management device further includes:
   a voltage sensor configured to detect the voltage of the battery, and
   an operation power estimation unit configured to estimate an operation power of the electric load connected to the battery,
   wherein the power supply management device is further configured to estimate the operation current value based on the estimated operation power of the electric load and the voltage of the battery detected by the voltage sensor.

3. The vehicle power supply device according to claim 1, wherein the power supply management device is further configured to reduce a state-of-charge operation range of the battery when the failure of the charge/discharge current sensor is detected.

4. The vehicle power supply device according to claim 1, wherein the power supply management device further includes:
   an electric generation control unit configured to control an on-vehicle electric generator in accordance with a vehicle travelling state,
   wherein the power supply management device is further is further configured to control the electric generation control unit to perform electric generation at a predetermined voltage when the failure of the charge/discharge current sensor is detected.

5. The vehicle power supply device according to claim 1, wherein the power supply management device further includes:
   a battery abnormality detection unit configured to detect that the battery is abnormal when the state of charge reaches an upper limit value or a lower limit value of a usable range.

6. The vehicle power supply device according to claim 5, wherein the power supply management device further includes:
   a fail-safe relay configured to interrupt an output of the battery based on a command from the battery abnormality detection unit.

* * * * *